Dec. 11, 1951  J. S. HOLLINGER  2,578,476
WORK INDEXING ATTACHMENT
Filed Sept. 21, 1946
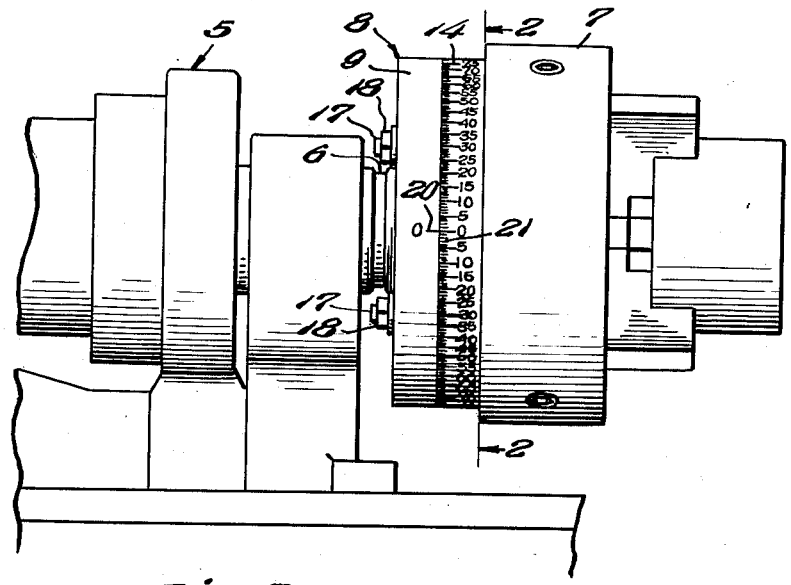
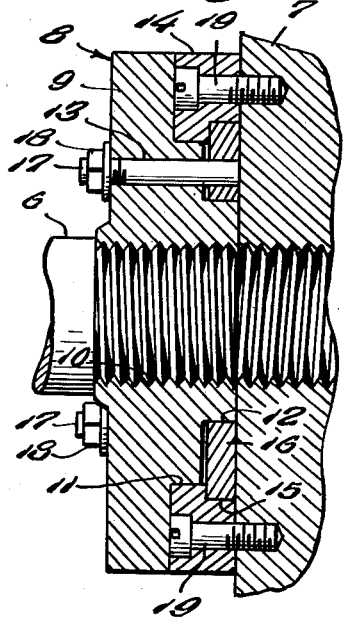
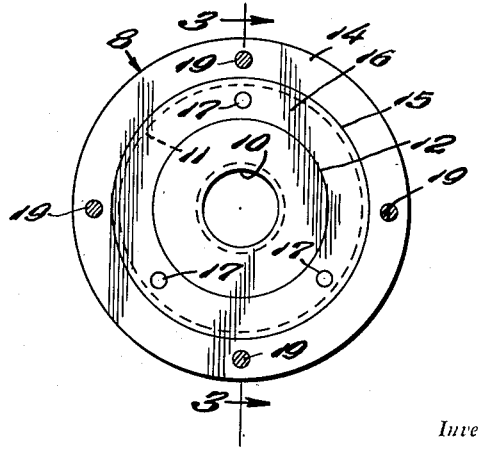
Inventor
John S. Hollinger
By Clarence A. O'Brien
and Harvey B. Jacobson
Attorneys Patented Dec. 11, 1951

2,578,476

UNITED STATES PATENT OFFICE 2,578,476

WORK INDEXING ATTACHMENT

John S. Hollinger, Pontiac, Mich.

Application September 21, 1946, Serial No. 698,531

1 Claim. (Cl. 90—57)

This invention relates to lathes and like machines having a rotary driven spindle on which a work holder is ordinarily secured, and more particularly to an indexing attachment adapted to be interposed between the spindle and the work holder so that the angular distance through which the work is moved may be accurately measured after each cut when performing certain operations, especially a milling or grinding operation with the spindle and work holder held stationary.

It is sometimes necessary to rotate the spindle of a lathe or like machine through a given or measured angle. For example, when a milling or grinding attachment is used upon the lathe or like machine and the work is held in the chuck or clamped to the face plate, the work is not continuously rotated as in the usual turning and drilling operations. Instead, the work is held stationary while one complete cut is made by the milling or grinding attachment, and then the work is rotated through a given part of a revoluation into correct position for the next cut. Examples of such operations are the milling and grinding of gear teeth, fluted reamers and the like. Obviously, the angular distance through which the work is moved after each cut must be accurately measured and definitely limited.

The primary object of my invention, therefore, is to provide an indexing attachment which may be applied to the spindle of a lathe or like machine, to enable the same to be accurately and easily manipulated and used in conjunction with a milling or grinding attachment.

A further object of the invention is to provide a work indexing attachment of the above kind which is extremely simple and compact in construction, which may be readily installed for use, and which is easy to use and highly efficient in use.

The exact nature of the present invention, as well as other objects and features thereof, will become apparent from the following description when considered in connection with the accompanying drawing, in which—

Figure 1 is a fragmentary side elevational view showing an indexing attachment constructed in accordance with the present invention and operatively associated with the spindle and work holder of a lathe.

Figure 2 is a transverse section taken on line 2—2 of Figure 1, and

Figure 3 is an enlarged vertical section taken on line 3—3 of Figure 2.

Referring in detail to the drawing, 5 indicates the usual head stock of a horizontal lathe in which is journalled the spindle 6 having a reduced threaded end upon which is ordinarily screwed the chuck 7 or other work holder, such as a face plate.

In accordance with the present invention, a work indexing attachment 8 is interposed between the spindle 6 and the work holder 7. As shown, such attachment includes a mounting disc 9 having a central threaded opening 10 whereby the same may be screwed upon the reduced threaded end of the spindle 6. The mounting disc 9 is further provided upon its inner face with stepped outer and inner annular shoulders 11 and 12 which are disposed concentric with and inwardly of the periphery of the disc 9. Also, three equally spaced transverse openings are provided through the mounting disc 9 at points intermediate the shoulders 11 and 12, one of which openings is indicated at 13 in Figure 3.

An index ring 14, of the same external diameter as the mounting disc 9, is rotatably fitted on the outer shoulder 11 and has a rabbet 15 in its inner edge. A clamping ring 16 is rotatably seated on the inner shoulder 12 and has its outer marginal portion received in the rabbet 15 of the index ring 14. The width or thickness of the ring 16 is slightly less than that of the shoulder 12 so that the index ring 14 may be clamped against turning relative to the mounting disc 9 by drawing the clamping ring 16 toward the mounting disc 9. Fixed to and projected laterally from the clamping ring 16 are three clamping bolts 17 which extend through the apertures or openings 13 of the mounting disc 9 and have nuts 18 threaded upon the projecting ends thereof. Thus, by tightening the nuts 18, the clamping ring 16 may be drawn toward the mounting disc 9 so as to securely clamp the index ring 14 against rotation relative to the supporting disc 9. Conversely, upon loosening the nuts 18, the index ring 14 is freed for rotation relative to the mounting disc 9.

The work holder 7 is secured to the inner face of the index ring 14 so as to be concentric with the axes of the spindle 6, mounting disc 9 and index ring 14. For this purpose, machine screws 19 are passed through the index ring 14 at equally spaced points and are threaded into the work holder 7, the heads of said machine screws 19 being countersunk in the index ring as shown in Figure 3. In this way, the work holder is attached to the index ring for rotation therewith relative to the mounting disc 9.

Co-acting pointer and degree graduations are provided on the periphery of the mounting disc and index ring for indicating the angular distances through which the work is moved upon turning the work holder 7 and index ring 14 relative to the spindle 6 and mounting disc 9. In other words, the co-acting pointer and degree graduations indicate the degrees of rotation of the index ring relative to the mounting disc. As shown, the pointer mark 20 is preferably provided on the periphery of the mounting disc 9, while the degree graduations 21 are provided on the periphery of the index ring 14. Also, the graduations 21 preferably progress from 0 to 180 degrees in opposite directions from the 0 graduations, as shown. In this way, the angular distances through which the work is moved in either direction may be readily and accurately measured.

Assuming that a cut has been made in the work while holding the spindle 6 stationary, with the parts in the position of Figure 1 and with the nuts 18 tightened, the nuts 18 are then loosened and the work holder 7 is rotated in the desired direction for the angular distance indicated by the proper graduation 21 aligned with the pointer mark 20. The nuts 18 are then tightened again so as to secure the work in the properly adjusted position for the next cut. This operation may be repeated in accordance with the number of cuts to be made in the work. Many jobs which would ordinarily be taken out of the lathe and put on a rotary table or dividing head, can be done on the lathe by the use of the present attachment. As a result of this, much time is saved because the work is already chucked and concentric.

From the foregoing description, it is believed that the construction, operation and advantages of the present invention will be readily understood and appreciated by those skilled in the art. Minor changes in details of construction illustrated and described, are contemplated, such as fall within the scope of the invention as claimed. The attachment is also useful in performing other operations, such as layout work, both on the face and perimeter of various parts.

What I claim is:

A work indexing attachment comprising a mounting disc centrally apertured and threaded for attachment to the threaded end of the spindle of a lathe or like machine, said mounting disc having stepped outer and inner annular shoulders on the inner face thereof concentric with and inwardly of the periphery of the same, an index ring rotatably fitted on the outer shoulder and having a rabbet in its inner edge, a clamping ring seated on the inner shoulder and having its outer marginal portion received in the rabbet of said index ring so that the index ring may be clamped against turning relative to the mounting disc by drawing the clamping ring toward said mounting disc, releasable means for drawing the clamping ring toward the mounting disc, means to secure a work holder to the index ring, and co-acting pointer mark and degree graduations on the peripheries of the mounting disc and index ring for indicating degrees of rotation of the index ring relative to the mounting disc.

JOHN S. HOLLINGER.

REFERENCES CITED

The following references are of record in the file of this patent:

UNITED STATES PATENTS

| Number | Name | Date |
| --- | --- | --- |
| 782,240 | Hanson | Feb. 14, 1905 |
| 798,310 | Wesson | Aug. 29, 1905 |
| 1,488,148 | Carlson | Mar. 25, 1924 |
| 2,324,476 | Becker | July 20, 1943 |
| 2,357,610 | Ryffe | Sept. 5, 1944 |